US012659470B2

(12) United States Patent
Pettersson et al.

(10) Patent No.: US 12,659,470 B2
(45) Date of Patent: Jun. 16, 2026

(54) METHOD AND DEVICE FOR PRUNING A VIDEO SEQUENCE

(71) Applicant: Axis AB, Lund (SE)

(72) Inventors: Mattias Pettersson, Lund (SE); Andreas Karlsson, Lund (SE)

(73) Assignee: AXIS AB, Lund (SE)

( * ) Notice: Subject to any disclaimer, the term of this patent is extended or adjusted under 35 U.S.C. 154(b) by 55 days.

(21) Appl. No.: 18/530,576

(22) Filed: Dec. 6, 2023

(65) Prior Publication Data

US 2024/0187578 A1     Jun. 6, 2024

(30) Foreign Application Priority Data

Dec. 6, 2022    (EP) ..................................... 22211665

(51) Int. Cl.
   *H04N 19/114*        (2014.01)
   *H04N 19/137*        (2014.01)

(52) U.S. Cl.
   CPC ......... *H04N 19/114* (2014.11); *H04N 19/137* (2014.11)

(58) Field of Classification Search
   None
   See application file for complete search history.

(56) References Cited

U.S. PATENT DOCUMENTS

2009/0122860 A1    5/2009  Yin et al.
2010/0296579 A1*  11/2010  Panchal ............... H04N 19/142
                                              375/E7.243

2013/0268502 A1   10/2013  Yang
2016/0198166 A1    7/2016  Kudana et al.
2020/0107016 A1*   4/2020  Li ........................ H04N 19/157
2021/0409790 A1   12/2021  Larrew et al.
2022/0046315 A1    2/2022  Kouncar
2024/0214562 A1*   6/2024  Ikonin .................. H04N 19/587

FOREIGN PATENT DOCUMENTS

KR          101531191 A      6/2015
KR         20170097392 A     8/2017
WO       WO-2021149892 A1 *  7/2021

OTHER PUBLICATIONS

Extended European Search Report issued on May 22, 2023 for European Patent Application No. 22211665.9.

* cited by examiner

*Primary Examiner* — Samuel D Fereja
(74) *Attorney, Agent, or Firm* — Volpe Koenig

(57)                ABSTRACT

A method prunes a prediction-coded video sequence and a corresponding pruning device. The pruning method comprises: obtaining one or more global motion values for the video sequence, wherein each global motion value represents an amount of motion in a scene depicted by a set of successive image frames in the video sequence; for a set of successive image frames having a global motion value being below a global motion threshold, identifying an immediately following group of pictures, GOP; obtaining a skip frame having the same frame configuration as the image frames of the identified GOP; replacing the initial intra frame of the identified GOP with the obtained skip frame; and configuring the skip frame and the remaining image frames of the identified GOP to form a continuation of a frame numbering of an immediately preceding GOP.

16 Claims, 2 Drawing Sheets

METHOD AND DEVICE FOR PRUNING A VIDEO SEQUENCE

TECHNICAL FIELD

The present invention relates to the field of efficient storage of video data. Specifically, the present invention proposes a method for pruning a prediction-coded video sequence.

BACKGROUND

Video is today acquired to an increasing degree in various contexts, for example for surveillance purposes. With an also increasing video complexity, including better resolution and improved image processing, the need for video storage capacity is continuously growing. However, storage capacity is not endless and is also associated with a cost both in purchase and maintenance. It is thus desirable to utilize storage capacity in an efficient way to avoid unnecessary costs.

One way to achieve an efficient storage capacity utilization is to perform pruning of stored video data. In general, the concept of pruning is to remove video data of low or no interest to keep. It can for example be video data that does not provide information of interest or provide information that can be retrieved elsewhere. Pruning may include removal of video data or adjusting video data to reduce its size, for example by compression. One example of the latter type of pruning is to perform transcoding of video sequences from one coding format to another, more compressed, coding format. A transcoding process includes decoding and encoding of the video frames to achieve adjustments such as a change in resolution, prediction-coding schemes, group of pictures (GOP) lengths, etc. There are numerous of parameters that can be adjusted in a transcoding process, making it a flexible compression process, and providing a way to keep video data to a lower storage capacity cost. However, transcoding is in itself a costly process with respect processing capacity and time.

There is evidently a need for improved pruning methods for video data.

WO 2021/149892 A1 discloses a pruning method for reducing size of recorded data by transcoding at least a portion of a first bitstream provided by a network video transmitter to process a second bitstream having an updated IDR (Instantaneous Decoder Refresh) period that has a time length different from that of an original IDR of the first bitstream.

SUMMARY OF THE INVENTION

An aim of the present invention is to provide a pruning method that reduces the amount of required storage space for a video sequence, without removing the video sequence as a whole. Another aim of the present invention is to provide a pruning method that is not based on transcoding. In other words, the pruning method should be performed without costly transcoding to eliminate the need for a decoding/encoding process.

The invention is defined by the appended claims.

According to a first aspect, these and other objects are achieved, in full or at least in part, by a method of pruning a prediction-coded video sequence, the method comprising:
- a) obtaining one or more global motion values for the video sequence, wherein each global motion value represents an amount of motion in a scene depicted by a set of successive image frames in the video sequence,
- b) for a set of successive image frames having a global motion value being below a global motion threshold, identifying a group of pictures, GOP, that immediately follows the set of successive image frames in the video sequence,
- c) determining a frame configuration of the image frames of the identified GOP,
- d) obtaining a skip frame having the determined frame configuration, i.e. having the same frame configuration as the image frames of the identified GOP,
- e) replacing the initial intra frame of the identified GOP with the obtained skip frame, and
- f) configuring the skip frame and the remaining image frames of the identified GOP with a frame numbering that continues a frame numbering of an immediately preceding GOP, whereby a new GOP is formed of frames of the immediately preceding GOP and the identified GOP.

The inventors have realized that the aim of the invention can be achieved by a concept of removing the initial intra frame of GOPs that immediately follow image frames that depicts a low motion scene. The amount of scene motion is represented by a global motion value which represents an amount of motion in a scene depicted by a set of successive image frames. The set of successive image frames may include one or more image frames. Global motion values will be exemplified in the description. The initial intra frame of such a GOP, i.e. of a GOP that immediately follows a set of successive image frames having a low global motion value, does not provide as much value as an initial intra frame of a GOP immediately following image frames that represent a scene with high motion. If high motion is present, a prediction-coded video sequence of a directly subsequent GOP is more dependent on its initial intra frames which functions as a restarting point in the video coding process. The intra frame is not dependent on any other frame and thus removes any introduced artefacts in previous inter frames caused by the prediction-coding format. However, if low motion is present in immediately preceding image frames, there is not as much need for the restarting point, at least not as often as in the case of a high motion scene.

In addition, the inventors have solved the aim of avoiding transcoding by replacing initial intra frames (that are removed) with considerably smaller skip frames, instead of re-coding frames of the video sequence. Each skip frame is provided with a frame configuration to fit into its current frame sequence, and the remaining image frames of the GOP (of the replaced intra frame) is adjusted such that a single GOP is formed together with the frames of the adjacent previous GOP. Details of the frame configuration and the adjustment of the remaining frames will be exemplified later in the description. By replacing the initial intra frame with a skip frame of suitable format, the frames per second (FPS) value for the video sequence is maintained, compared to if the initial intra frame would be removed without replacement or be replaced with other less suitable types of inter frames, such as a drop frame. It may be advantageous to maintain the FPS value, for example in cases where a decoder needs a minimum FPS value to be able to perform decoding. There may also exist a user required FPS value that needs to be maintained.

By replacing initial intra frames of a GOP, some information of the video is lost and the effect of a restart frame during the decoding of the video sequence is removed. However, artefacts that are possibly maintained as a consequence of removing the intra frame will be less significant due to the low motion of the scene in the immediately preceding image frames to the replaced initial intra frame. A scene with a higher motion utilizes referencing of the prediction-coding process to a higher degree, thus increasing the risk of artefacts. A well-balance pruning method is achieved by the present invention where the advantages of lowering required storage space is achieved to a low risk of introducing artefacts and, in addition, without the need for costly transcoding.

As used herein prediction-coded video refers to the well-known type of video coding that video compression standards such as H.264 and H.265 are based on. The concept of prediction-coding is to replace encoding of some image data itself with references to other similar image data that have been coded. A compressed format is achieved by reducing the amount of directly encoded image data, i.e. raw image data that are encoded, and replacing it with references. Prediction-coded video is formed by different types of image frames which differ in how they are coded. Image data that are coded in itself, not by referencing other image data, are so called intra-coded and do not include any references to other image data. Image data that are coded as references are so called inter-coded. A reference includes a pointer to the referenced image data, and may include a residual value, also known as prediction error. The residual value indicates a difference between the image data that is represented and the referenced image data. Thus, image data can reference image data that are not an exact match and add information representing the difference, to achieve a fair representation of the image data. Coded image data are divided into image frames that represent points in time when the image data were acquired. A sequence of image frames represents image data acquired over a time period. The sequence of image frames forms a video sequence. Depending on how the image data of an image frame is coded, i.e. intra or inter coded, the frame may be referred to as an intra frame or an inter frame. An intra frame is a frame in which all image data are independently encoded, i.e. without reference to other image data, and can thus be decoded independently. Intra frames are also known as I-frames, intra coded pictures, or keyframes. An inter frame is a frame in which some or all image data are coded as references, and the decoding of such a frame is thus dependent on other image frames. There exist different types of inter frames depending on how the references are formed, for example predictive coded frames (P-frames) and bipredictive coded frames (B-frames).

As used herein group of pictures or GOP means a collection or set of successive prediction-coded image frames being defined by a GOP structure. A GOP structure defines which order frames have within a GOP. A GOP begins with an intra coded frame, herein referred to as an initial intra frame. A GOP also includes inter frames.

As used herein skip frame means a type of inter frame that represents image data by only references to other image data and not residual values. Thus, when decoding a skip frame, the decoder uses the referenced image data as a representation of the image data represented by the skip frame, without making any adjustments. A skip frame is small in data size compared to other types of image frames and may be generated to a low processing cost.

As used herein frame configuration means settings of frame parameters that define the format of a frame. Frame parameters may be the same for all frames in a GOP, video sequence, or video. Frame parameters can in some standards be referred to as picture parameter set (PPS), sequence parameter set (SPS), or video parameter set (VPS) depending on which parameters they include. Non-limiting examples of what frame parameters specifically defines include: number of macroblocks in both image directions, base QP value, type of entropy coding that is used (typically CABAC or CAVLC), and type of coding that should be used (e.g., what parts of a coding standard that should be used). By frame configuration in the context of this application is meant that it concerns parameters that need to be the same for a replacement frame in a GOP as for the rest of the frames in at least the same GOP, in order to not need transcoding for the replacement.

As used herein global motion value means a value that indicates the amount of motion that is present in a scene during the acquisition of a set of successive image frames, for example a GOP. The global motion value may be determined in various ways which will be exemplified in the description. The global motion value is an estimation of the scene motion.

Some examples of implementations will now be summarized.

In one example, a camera comprising an image sensor acquires image data, performs image processing, encodes the image data and provides coded video to a receiver, for example a storage device. The camera also determines global motion values for sets of successive image frames that are coded. The global motion values may be determined for defined sets of successive image frames, for example for each GOP in the video sequence. Alternatively, a global motion value may for example be determined and added to a generated video sequence regularly, for example once every second, or irregularly. The global motion value then represents motion depicted by image frames that have been acquired since a previous global motion value was determined. The global motion value may be determined using information from one or more internal processes of the camera, for example the image processing pipeline, the encoder, or a controller of a mechanical actuator in case the camera has mechanical moving capabilities. The global motion value is added to the video sequence as metadata, for example in a supplemental enhancement information (SEI) message or similar metadata, in association with the image frames that it concerns before transmitting it to the receiver.

According to one embodiment of the invention, the received video sequence is pruned according to the proposed pruning method, optionally after a predetermined storage period. Global motion values are obtained for a plurality of sets of successive image frames by retrieving the information from metadata, for example SEI messages. From the global motion values, GOPs that each immediately follows a set of successive image frames having a global motion value, i.e. a set of image frames depicting a scene with low motion (during the period of acquiring those frames), are identified. Initial intra frames of the identified GOPs are replaced with skip frames of suitable frame format.

By a GOP immediately following a set of successive image frames is meant a GOP that is located after and adjacent to the set of successive image frames in the video sequence, or is partly overlapping with the set of successive image frames. By partly overlapping is here meant that one or more image frames form both an end of the set of successive image frames and a beginning of the GOP. The GOP comprises at least one image frame that is located after the set of successive image frames.

In another embodiment, the global motion values are determined in connection with the pruning of a video sequence, i.e. not in connection with the generation of the video sequence in the camera. The global motion values may in this embodiment be determined by comparing corresponding pixel values of successive image frames in order to determine the amount or magnitude of movement. Alternatively, an image analysis process may be performed to determine the amount or magnitude of movement. Yet another alternative is to retrieve information of the video sequence that indicates settings of a mechanical actuator of the camera, provided that such information is added to the video sequence by the camera.

In one embodiment, the method of pruning includes an additional balance mechanism with the purpose of limiting the aggregated effect of replacing initial image frames of successive GOPs. Even though the risk of significant artefacts is decreased by selecting GOPs immediately following a set of successive image frames with low motion for the replacement, a build-up of artefacts over time is not eliminated. To counteract such build-up, the method may comprise a further condition, besides the condition of low motion, for the replacement. In one variant, the condition is to check if the identified GOP neighbors a predetermined number of consecutive GOPs in which the initial frames have been replaced with skip frames. The predetermined number may for example be 4, in which case at least every fifth GOP maintains its initial intra frame even though its global motion value is below the motion threshold. In this way, the restarting effect provided by the initial intra frame is kept even for long periods of low motion scenes, however with a decreased frequency. In another variant, the condition is to check if the immediately preceding GOP comprises more than a predetermined number of frames. If so, the initial intra frame is maintained. If not, the initial intra frame is replaced with a skip frame. In this way, the method takes into account that artefacts can build up by long inter frame sequences even though the represented motion is low in those frames. Thus, there is a benefit in maintaining the restarting effect provided by the initial intra frame when following a long GOP. The two variants can be combined in a single embodiment.

According to a second aspect, the invention is a device for pruning a prediction-coded video sequence. The device comprises a processor that is adapted to: obtain one or more global motion values for the video sequence, wherein each global motion value represents an amount of motion in a scene depicted by a set of successive image frames in the video sequence, for a set of successive image frames having a global motion value being below a global motion threshold, identify a group of pictures, GOP, that immediately follows the set of successive image frames in the video sequence,
    determine a frame configuration of the image frames of the identified GOP,
    obtain a skip frame having the determined frame configuration, i.e. having the same frame configuration as the image frames of the identified GOP,
    replace the initial intra frame of the identified GOP with the obtained skip frame, and configure the skip frame and the remaining image frames of the identified GOP with a frame numbering that continues a frame numbering of an immediately preceding GOP, whereby a new GOP is formed of frames of the immediately preceding GOP and the identified GOP.

The pruning device may be part of a storage device or form a separate device. The pruning device may establish a temporary connection with a storage device, or parts therein, for performing pruning of one of more video sequences. The pruning device of the third aspect may generally be embodied in the same ways as the method of the first aspect with accompanying advantages.

According to a third aspect, the invention is a system that comprises a camera, a storage device, and a pruning device. The camera is adapted to generate a video sequence comprising prediction-coded image frames depicting a scene; determine global motion values for sets of successive image frames in the video sequence, wherein each global motion value represents an amount of motion in the scene depicted by a set of successive image frames in the video sequence, add the determined global motion values to the video sequence; and transmit the video sequence to the storage device. The storage device is adapted to receive the video sequence from the camera; and store the video sequence in a long-term storage unit. The pruning device is configured according to any embodiment of the second aspect, and is thus adapted to prune the stored video sequence.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF EMBODIMENTS

Figure 1:
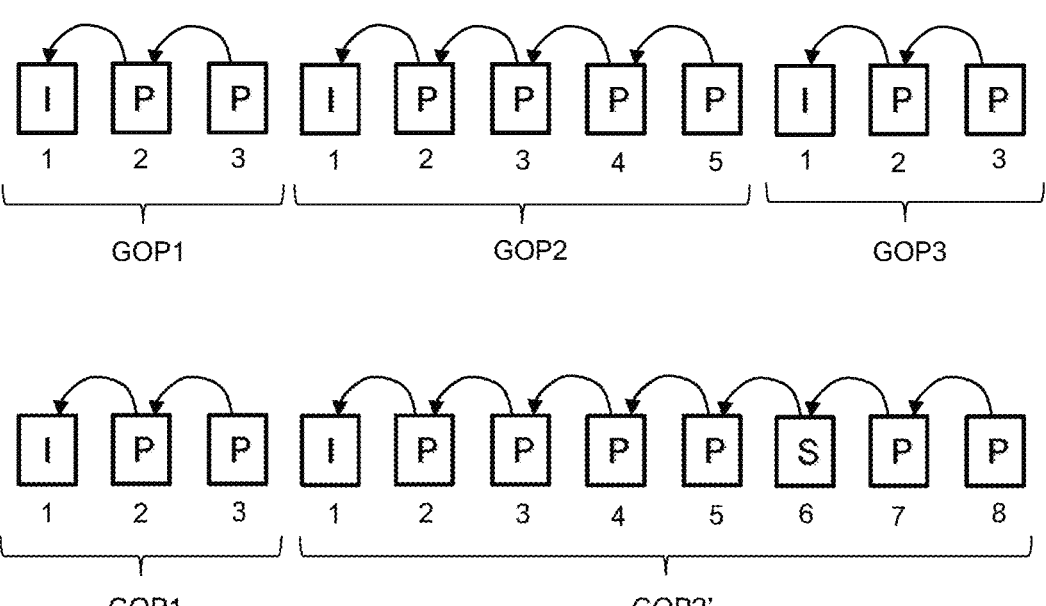
FIG. 1 is an example of GOPs of a video sequence before and after pruning.

The concept of the present invention will first be described with reference to FIG. 1 illustrating a first video sequence in the upper part and a second video sequence in the lower part. The first video sequence represents a video sequence as it is generated by a camera. The first video sequence comprises a number of coded image frames that each represents image data acquired at a point in time by an image sensor of the camera. The video sequence thus represents image data acquired at successive points in time, thereby depicting a scene during a time period. The scene can be an outdoor or an indoor environment.

The image data are prediction-coded by an encoder of the camera, thereby generating coded image frames of the video sequence. The video sequence comprises three group of pictures (GOPs), here called GOP1, GOP2, and GOP3. Each GOP begins with an initial intra frame I followed by predictive coded frames P. The predictive coded frames P are coded fully or partly by using references to a previous frame of the same GOP, as indicated by the arrows of FIG. 1. In alternative embodiments, the GOPs may include bipredictive inter frames B that include references to one or more image frames. H.264 and H.265 are examples of prediction-coding standards that can be used for implementing the invention. The skilled person has capability to translate terminology and implementation adjustments needed for other possible video coding standards as well, for example H.263, AV1, and future H.266.

Each GOP has a frame numbering starting with 1 for the initial frame and increasing for subsequent frames in the GOP. The frame numbering may indicate a decoding order of the frames and may be set as a header parameter of each frame by the encoder in accordance with the used video coding standard.

The inventive concept is to reduce required storage space for the video sequence by replacing intra frames, which takes up relatively much storage space, with skip frames which are very small in data size in comparison. In order to keep as much information as possible that is provided by the image data, a smart selection of which initial intra frames to replace is made. For this purpose, a global motion value is introduced. The global motion value represents how much movement there has been in a scene depicted by image frames of a set of successive image frames. In this example, the set of successive image frames corresponds to a GOP, i.e. a global motion value is determined for each GOP. In other embodiments, the set of successive image frames may comprise image frames of several GOPs, or one or more image frames being a subset of a GOP.

Using the global motion value, initial intra frames of GOPs that immediately follows a GOP having a low motion are identified and replaced with skip frames. In the second video sequence of FIG. 1, the initial intra frame of original GOP GOP3 has been replaced with a skip frame S since GOP3 is identified as immediately following a GOP GOP2 having a global motion value below a set threshold. In addition to the replacement, a renumbering is also performed for the frames of the identified GOP, in this example GOP3. The image frames of GOP3 are renumbered such that the image frames of GOP2 and GOP3 are provided with a consecutive numbering. In this example, the skip frame S and remaining inter frames of original GOP3 are provided with numbering 6-8 which follows the numbering 1-5 of the immediately preceding GOP, namely GOP2. After the replacement and renumbering, GOP2 and GOP3 have become merged into a single GOP GOP2' as seen by a decoder. In other words, when a decoder decodes the video sequence, it will interpret the frames of GOP2 and GOP3 (with replaced initial intra frame) as a single GOP GOP2'.

The inventive concept provides a way to, without transcoding, reduce the required storage space for the video sequence with a low risk of introducing artefacts due to the removal of intra frames.

The global motion value threshold is a value used for determining if image frames of a set of successive image frames depict a scene with high or low motion. The threshold which defines the boundary between low motion and high motion may be set differently. For example, the global motion value threshold may be set by a user. The threshold may be a camera or scene specific threshold, meaning that the pruning device applies a threshold depending on which camera or scene that the set of successive image frames is associated with. Such information, for example a camera ID or a value indicating a scene type, may be added as metadata of the video sequence, preferably by the camera.

The global motion value threshold may be set based on a minimum global motion value and/or a maximum global motion value as determined over a plurality of GOPs.

The global motion value threshold may vary over a time period, for example having a low value during night when an expected maximum global motion value is low and high during the day when an expected maximum global motion value is high.

Going more into details, the determination of global motion values will now be described.

In a first variant, the global motion value is determined in connection with the generation of the video sequence, typically in a processor of the camera, and added to the video sequence, for example as metadata, for example in a supplemental enhancement information (SEI) message. The global motion value can thereby be retrieved for the purpose of finding sets of successive image frames having low motion.

In this first variant, there are several possible embodiments in which the global motion value is determined based on information retrieved from existing processes.

As a first example, the global motion value for a set of successive image frames may be determined based on image frame specific values representing pixel value differences of the image frame compared to a preceding image frame. The image frame specific values may be retrieved from an encoder which determined such values during its prediction-coding process. A global motion value for a set of successive image frames may thus be determined by retrieving image frame specific values for each image frame in the set and determine a global motion value for the set based on the retrieved values.

As a second example, the global motion value for a set of successive image frames may be determined based on information retrieved from a noise filtering algorithm performed in an image processing pipeline (IPP) of the camera. This example is based on the condition that the noise filtering algorithm comprises a temporal noise filtering which generates a local map, within the algorithm, of an image frame in which noise is distinguished from depicted scene movement on a pixel or pixel block level. Local maps for each image frame of the set are retrieved from the noise filtering algorithm and a global motion value is determined based on the retrieved local maps. For example, the amount of motion that an image frame comprises may be determined by calculating a ratio between the amount of blocks of the image frame that contain movement (not noise) according to the noise filtering algorithm and the total amount of blocks in the image frame.

As a third example, the global motion value for a set of successive image frames may be determined using image analysis. This example is based on the condition that the camera performs an image analysis process that is based on motion detection, motion estimation, or optical flow estimation in image frames. The image analysis process can be for example an object tracking algorithm or an event detection algorithm. From the image analysis process, information indicating the determined motion of image frames of a set may be retrieved, and the global motion value for the set can be determined based on the retrieved information.

As a fourth example, the global motion value may be determined based on information retrieved from a mechanical actuator of the camera. This example is based on the condition that the camera has movement capabilities, for example pan and tilt movement capabilities. The camera may be a conventional PTZ camera. Information retrieved from the actuator may be a frame or GOP specific value indicating whether a pan or tilt movement is active or not during the acquisition of the frame or of the GOP frames. The frame or GOP specific value may be added to the image frames or GOP as metadata for other purposes than determining a global motion value, and can thus be used by a receiver of the image frames for determining a global motion value. At the camera side, the frame or GOP specific values may be used directly to determine a global motion value for the GOP and add it as metadata of the GOP, for example in a SEI message. The global motion value may in this example be a binary value that indicates whether or not there is motion present in at least one frame of the GOP.

As a fifth example, the global motion value may be determined based on information retrieved from a motion sensor of the camera, for example an accelerometer, a gyro, or a magnetometer. The motion sensor is adapted to determine global movement of the camera and provide information to for example a processor of the camera. Motion sensors are already used in some camera types for other purposes than determining a global motion value. Data from the motion sensor may be retrieved on, for example, a frame level or a GOP level. The data may indicate whether the camera is moving or not during the acquisition of frames. The data may also indicate the amount of motion with or without directional information. The data can be added to the image sequence in association with the corresponding set of successive image frames as metadata or can be used directly by a processor of the camera to determine a global motion value which is added as metadata.

As a sixth example, the global motion value may be determined by analyzing a size ratio between a data size of one or more initial intra frames of the set of successive image frames and a data size based on all frames of the set of successive image frames. The data size based on all frames may for example be a mean data size for the frames of the set of successive image frames or a sum of all frame data sizes in the set. The data size may be expressed in convention data size format, for example in bytes. The calculated size ratio is a unitless measure which indicates the global motion value. A higher size ratio yields a higher global motion value, and vice versa. The global motion value is thus in this example a relative measure.

For each of the above examples where a global motion value for a set of successive image frames is determined based on individual motion values for the image frames of the set, the global motion value is preferably determined to be the maximum motion value for an image frame of the set.

As mentioned for some examples above, supplemental enhancement information (SEI) messages can be used for transmitting global motion values, or values that can be used for determining global motion values. A SEI message is a data structure that can carry different types of information in a video sequence. For the purpose of carrying a global motion value, the SEI message is preferably of a registered type, or, in case of an unregistered SEI message, includes a universally unique identified (UUID) which defines that the SEI message includes data of the type global motion value.

In a second variant, the global motion value is determined in connection with the pruning. Some examples of this variant have already been mentioned, for example that a global motion value may be determined based on frame or GOP specific values that indicates if mechanical movement of the camera is present during acquisition. Other examples include that retrieved values from an image processing algorithm, noise filtering algorithm, or frame size ratio calculator, are added to the video sequence, for example in a SEI message, and used by the receiver to determine global motion values, thereby obtaining the global motion values at the receiver side. It is also envisaged that obtaining of global motion values at the receiver includes determining values for the determination of the global motion values, for example by performing selected parts of image processing, noise filtering, or frame size ration calculations based on the video sequence.

Going more into detail of the replacement of an initial intra frame with a skip frame, the configuration of the skip frame will now be explained. As defined, the skip frame represents image data by referring to image data of other frames without adding difference information. In other words, a skip frames are coded without using motion vectors and without adding residual values. By configuring the skip frame to fit into the frame sequence to which it is added, in particular with the frames of the GOP of the replaced initial intra frame and its immediately previous GOP, the replacement is not dependent on transcoding. In other words, if the skip frame is configured correctly, the video sequence can still be successfully decoded without having been transcoded when adding the skip frame. In general, the skip frame needs to have a frame configuration that matches the inter frames of the GOP with respect to for example resolution, quantisation parameter values, index of picture parameter set, and type of entropy coding, so that there is no need for transcoding when introducing the skip frame in the GOP.

Details of the required configuration of the skip frame is dependent on which compression standard that has been applied during encoding of the video sequence. A skilled man can without undue burden determine implementation details with respect to which frame configuration is required for the skip frames in the context of a particular video compression standard. For example, a required frame configuration for the video compression standard H.264 requires that the following frame parameters of the skip set is set as in the remaining frames of the GOP: number of macroblocks in x- and y-directions, base QP value, which picture parameter set that is referenced, and whether entropy coding is performed according to CABAC or CAVLC.

In some implementations, a reference to a previous inter frame, which image data is referenced to by the skip frame, may need to be actively added or adjusted for the skip frame. For example, in an implementation based on the video compression standard H.264 or H.265 where both predictive and bipredictive inter frames are used, a skip frame needs to be configured such that it references a previous predictive inter frame, not a bipredictive inter frame.

Once the frame configuration of the skip frame has been determined, the skip frame is obtained and added as a replacement for the initial image frame of an identified GOP. The skip frame may be obtained by generating it from scratch. This is done using an encoding process that is adapted to perform encoding according to the same video coding standard as the frames of the video sequence, e.g. H.264. In another embodiment, skip frames of different frame configurations may be stored and retrieved from a memory upon determining the frame configuration, on condition that a skip frame of the correct frame configuration has been stored. If not found in the memory, a skip frame of the correct frame configuration can be generated, by encoding, and used by the pruning algorithm, and in addition stored in the memory for being available for the pruning algorithm onwards.

When the skip frame has replaced the initial intra frame of an identified GOP, a renumbering of the remaining frames of the identified GOP is required in order for the decoding of the video sequence to function. Since an initial intra frame, which defines a start frame for a GOP, is replaced with a type of inter frame, the number of GOPs in the video sequence is reduced by one. The remaining inter frames of the selected GOP are now instead part of the immediately preceding GOP and should therefore be given a numbering in accordance with this new structure. The renumbering process will now be exemplified with reference to FIG. 1. Frames of each GOP are given a numbering starting with 1 for the initial intra frame and increasing with one for each frame in the GOP. For example, the five frames of GOP2 are provided with a frame number sequence 1-5.

The numbering may be implemented differently depending on which video compression standard that has been used for encoding the video sequence. In the standard H.264, for example, the numbering is defined in header fields "frame number" and "picture order count" ("POC") which are part of a header to each frame. In the standard H.265, a header field "picture order count" or "POC" is used for numbering the frames. The POC value indicates a display order of the frames, i.e. in which order frames should be displayed after decoding. There may exist other parameters that define the frame numbering and that need to be adjusted, for example parameters that indicate a decoding order. Which values or parameters that define the frame numbering for a particular video coding standard is well-known knowledge which can be retrieved from the definition of the video coding standard used for encoding the video sequence. The skilled person thus knows how renumbering of the remaining frames of the selected GOP should be implemented so as to follow a particular video compression standard. In the example of FIG. 1, the skip frame S together with the remaining inter frames of GOP3 are given a numbering 6-8 which continues the numbering 1-5 of GOP2. After the replacement of the initial intra frame of GOP2 and renumbering of the remaining inter frames of GOP2, the video sequence comprises a GOP2' which consists of the unmodified frames of GOP2, the skip frame S, and the remaining and renumbered inter frames former part of GOP3.

Since the skip frame is provided with a same frame configuration as the other frames of the identified GOP, and possibly the same as the rest of the video sequence, and since the remaining frames of the identified GOP are renumbered, transcoding of the identified GOP is not required. The GOP, and the rest of the video sequence, can still be decoded successfully. Thus, the cumbersome task of transcoding the video sequence is eliminated from the pruning process. However, there may exist other reasons for performing transcoding which is not prevented by the suggested way of pruning. In other words, the herein disclosed method of pruning may be performed with or without transcoding the video sequence.

Figure 2:
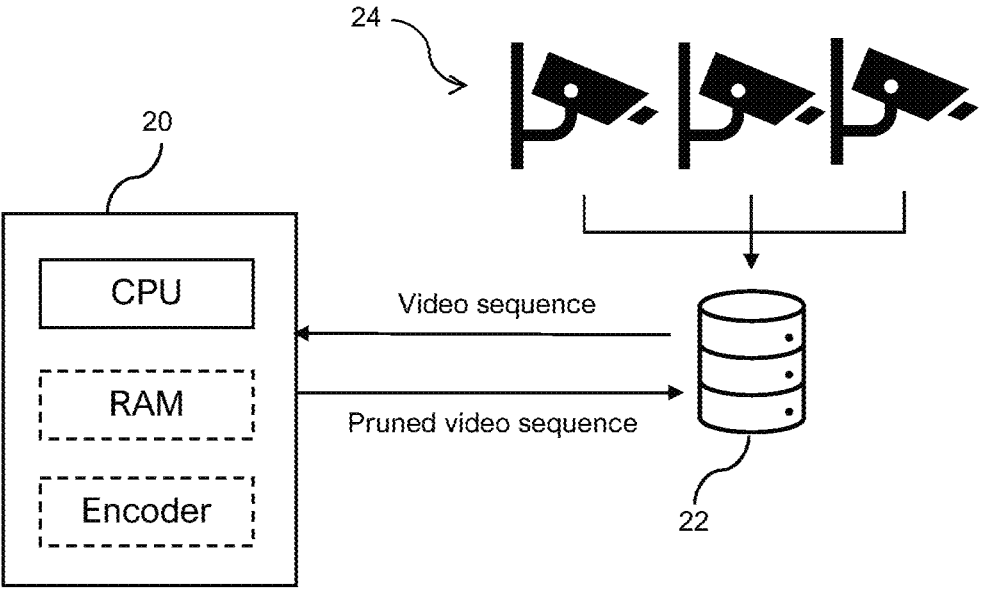
FIG. 2 is an example of a pruning device being connected to a storage device.

The pruning process may be performed by a pruning device 20 as illustrated in FIG. 2. The pruning device 20 is here a separate hardware or software module to a storage device 22 in which video is stored. The pruning device 20 has a temporary or fixed connection to the storage device 22. The storage device 22 receives video from one or more cameras of a camera system 24 for long-term storage.

The pruning device 20 comprises a processing device in the form of a CPU, a memory in the form of a RAM, and optionally an encoding device in the form of an encoder. The pruning device 20 is adapted to retrieve video sequences from the storage device 22 and perform pruning according to the disclosed pruning concept of the retrieved video sequences. Specifically, the CPU is adapted to obtain global motion values for sets of successive image frames of retrieved video sequences, and identify GOPs that each immediately follow a set of successive image frames for which a global motion value is below a motion threshold. Moreover, the CPU is adapted to obtain skip frames for replacing initial intra frames of identified GOPs. The encoder may be utilized by the CPU for generating skip frames with a suitable frame configuration, i.e. a frame configuration that the other frames of the identified GOP have. Alternatively, skip frames of suitable frame configurations may be available in the RAM. The CPU may be adapted to obtain the skip frames by retrieval from the RAM. In addition, the CPU is adapted to adjust the remaining frames of identified GOPs by renumbering them. The pruned video sequence is thereafter returned to the storage device 22 for further storing.

The pruning device 20 may be adapted to perform pruning of stored video sequences upon an automatic or user-initiated trigger, or at a predetermined intervals such as once each 30 days or once each 3 months.

The pruning device 20 may be implemented as hardware, software, or a combination of both. In a hardware implementation, the processing device may correspond to circuitry which is dedicated and specifically designed to provide functionality of the parts. The circuitry may be in the form of one or more integrated circuits, such as one or more application specific integrated circuits or one or more field-programmable gate arrays. In a software implementation, the circuitry may instead be in the form of a processor, such as a microprocessor, which in association with computer code instructions stored on a (non-transitory) computer-readable medium, such as a non-volatile memory, causes the pruning device 20 to carry out methods that are disclosed herein. Examples of non-volatile memory include read-only memory, flash memory, ferroelectric RAM, magnetic computer storage devices, optical discs, and the like. It is to be understood that it is also possible to have a combination of a hardware and a software implementation, meaning that some of the functionalities of the pruning method are performed by hardware and others by software.

Figure 3:
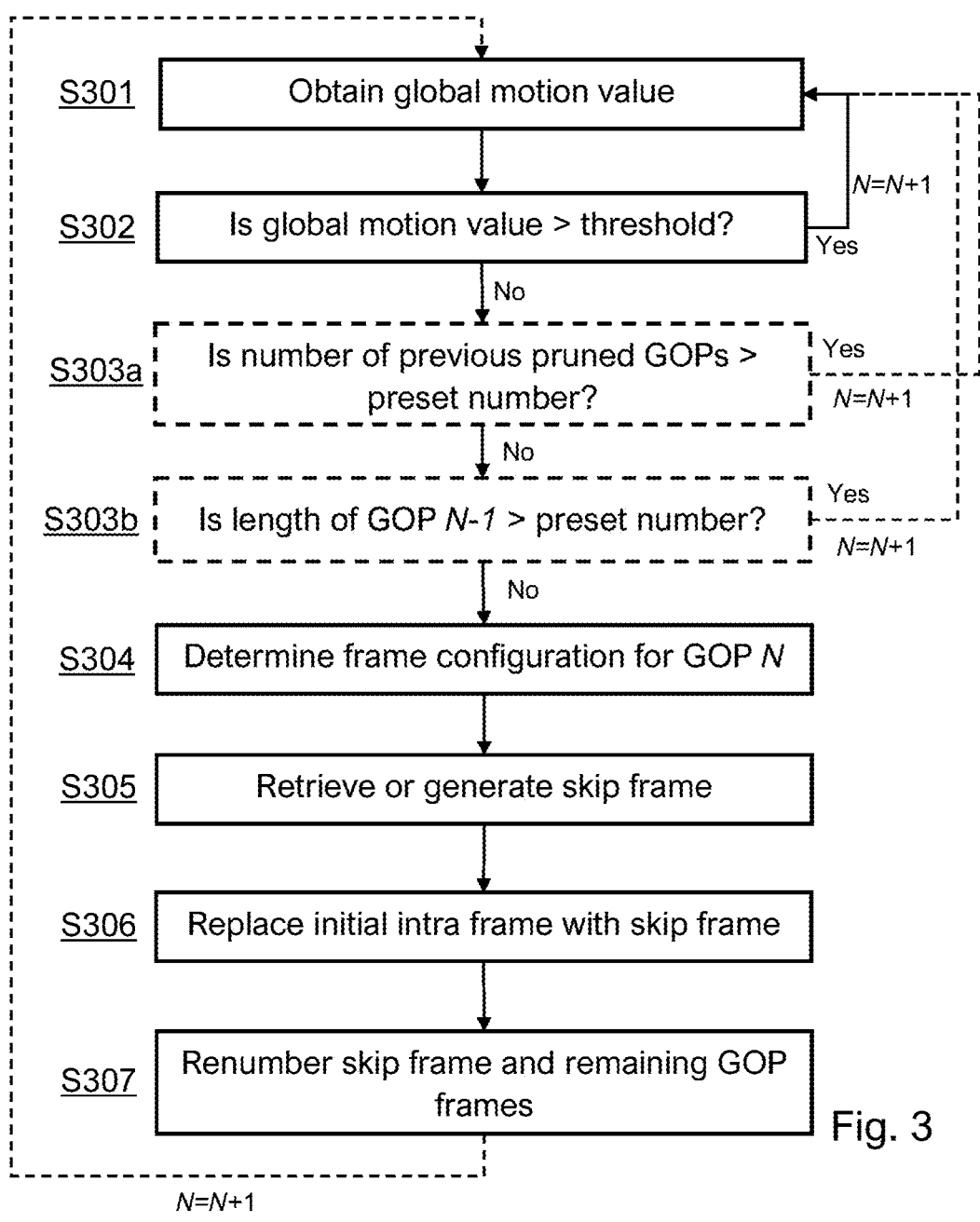
FIG. 3 is a flow chart of a method of pruning a prediction-coded video sequence according to an embodiment.

A general overview of the pruning method, along with description of some embodiments, will now be given with reference to FIG. 3. The pruning method is performed on a video sequence and may be performed by a pruning device, for example the one exemplified in FIG. 2. Starting from the temporally second acquired GOP of the video sequence, the pruning method goes through the video sequence GOP by GOP in chronological order. For a first GOP N, for example GOP2 of FIG. 1, a global motion value is obtained S301 for image frames that precede that GOP. In other words, a global motion value for a set of successive image frames which includes at least one immediately preceding image frame to the GOP N is located. The set of successive image frames may include image frames of the GOP N as well. The global motion value may be located in metadata at any location of the video sequence as long as an association between the global motion value and the image frames it relates to is provided. Next, the global motion value is compared S302 to a threshold to determine if the immediately preceding image frames to the GOP N depict a scene having low or high amount of movement. If the global motion value is above the threshold, corresponding to high amount of motion, the initial intra frame of GOP N is maintained without adjustments. The pruning device continues its pruning process by moving forward to the next GOP N+1 and obtaining S301 a global motion value for the immediately preceding image frames.

If, however, the global motion value is not above the threshold, the pruning process continues its processing for the GOP N. A next step is to determine S304 a frame configuration of the image frames in the GOP N. This may be performed by retrieving information from headers of the video stream (bit stream), the GOP or the individual image frames, for example information about resolution or parameter sets. Next, a skip frame having the determined frame configuration is retrieved or generated S305. The initial intra frame of the GOP N is replaced S306 with the skip frame by identifying and removing the image data and header data corresponding to the initial image frame and adding the skip frame at the same location in the video sequence. The pruning is finalized by renumbering S307 the frames of the GOP N. The skip frame and the remaining frames of the GOP N are numbered such that the frame numbering of frames of the immediately preceding GOP N−1 and the current GOP N forms a sequential numbering. The skip frame and the remaining frames are thus numbered to form a continuation of the frame numbering of the immediately preceding GOP N−1.

Although the removal of initial intra frames of GOPs as described herein is advantageous, it may be desirable to limit the number of initial intra frames that are replaced with skip frames. Even though the risk of introducing artefacts is lower for a set of successive image frames of a low motion scene than for a set of successive image frames of a high motion scene, there still exists a risk which increases with the number of consecutive initial intra frames that are removed. For this purpose, an embodiment of the pruning method includes an additional check S303a that not too many consecutive GOPs are pruned.

By pruned GOP is meant a GOP in which the initial image frame has been replaced with a skip frame. This check S303a is performed by the pruning process after a GOP has been identified and before determining a frame configuration of a replacement skip frame. The number of previous pruned GOPs may be represented by a counter value which is stored in a local memory of the pruning device. The counter value is reset to 0 for every GOP that is maintained intact caused by that the pruning process determines that a global motion value of immediately preceding image frames is above the global motion value threshold. The counter value is increased by 1 for every skip frame that replaces an initial intra frame of a GOP. The preset number may be set to for example 4 or 9, meaning that every fifth or tenth GOP is maintained intact even if the global motion value of the immediately preceding image frames is below the global motion value threshold. This embodiment enables setting a balance between efficient pruning by removing initial intra frame and the risk of introducing artefacts in the video due to the removal.

In one embodiment of the invention, a length of the immediately preceding GOP to the identified GOP is taken into consideration when pruning the video sequence. An additional step S303b is part of the method in this embodiment. As an additional condition to the condition of that a global motion level must be less than a motion threshold, the length of the immediately preceding GOP needs to be less than a length threshold in order for the replacement of the initial intra frame to take place. In other words, the number of frames in the immediately preceding GOP needs to be less than a predetermined number. If the length of the immediately preceding GOP is equal to or exceeds the length threshold, the initial intra frame in the identified GOP is maintained and thus not replaced with a skip frame. This embodiment takes into account that even though the global motion level is low for a GOP, the fact that there are many frames increases the risk of introducing artefacts. In addition, long GOPs may introduce a problem of requiring much processing resources during replay of a video, for example when a user wants to jump to a specific image frame located late in a long GOP. Another problem with long GOPs is that some replay devices or decoders cannot handle GOPs above a certain length.

It will be appreciated that a person skilled in the art can modify the above-described embodiments in many ways and still use the advantages of the invention as shown in the embodiments above.

The invention claimed is:

1. A method of pruning a prediction-coded video sequence, the method comprising:
    a) obtaining one or more global motion values for the video sequence, wherein each global motion value represents an amount of motion in a scene depicted by a set of successive image frames in the video sequence;
    b) for a set of successive image frames having a global motion value being below a global motion threshold, identifying a group of pictures (GOP), that immediately follows the set of successive image frames in the video sequence, wherein the identified GOP comprises a sub-set of image frames of the video sequence;
    c) determining a frame configuration of the image frames of the identified GOP wherein the determined frame configuration defines settings of frame parameters that need to be the same for a replacement frame in the identified GOP as for the rest of the frames in the identified GOP;
    d) obtaining a skip frame having the determined frame configuration, wherein the skip frame is an inter frame that directly references existing image data of at least one previously coded frame of the video sequence and that is coded without interpolation of residual information;
    e) replacing the initial intra frame of the identified GOP with the obtained skip frame; and
    f) configuring the skip frame and the remaining image frames of the identified GOP with a frame numbering that continues a frame numbering of the GOP immediately preceding the identified GOP, whereby a new GOP is formed of frames of the immediately preceding GOP and the identified GOP,
    wherein replacing the initial intra frame of the identified GOP with the obtained skip frame and configuring the skip frame and the remaining image frames of the identified GOP with a frame numbering that continues a frame numbering of the GOP immediately preceding the identified GOP are performed without transcoding the remaining image frames of the identified GOP, including without decoding and re-encoding the remaining image frames of the identified GOP.

2. The method according to claim 1, wherein the step of obtaining one or more global motion values for the video sequence comprises, for each global motion value, retrieving one or more values included in the video sequence as metadata, and determining the global motion value based on the retrieved one or more values.

3. The method according to claim 2, wherein the retrieved one or more values comprises one or more of:

an image frame specific value representing pixel value differences of the image frame compared to a preceding frame as determined by an encoder, a value indicating motion in an image frame as deduced from a noise filtering algorithm, a value indicating motion in an image frame as determined by an image analysis process, and a value indicating whether a pan or tilt movement is active or not in the camera while acquiring the image frame.

4. The method according to claim 3, wherein the one or more values are located in one or more supplemental enhancement information (SEI) message.

5. The method according to claim 2, wherein the one or more values are located in one or more supplemental enhancement information (SEI) message.

6. The method according to claim 1, wherein the step of obtaining one or more global motion values for the video sequence comprises determining a global motion value for each set of successive image frames based on a ratio between a size of an intra frame in the set of successive image frames and a mean size or a maximum size of inter frames in the set of successive image frames, wherein a higher ratio generates a higher global motion value.

7. The method according to claim 1, wherein each set of successive image frames corresponds to a GOP of the video sequence.

8. The method according to claim 1, further comprising evaluating if the identified GOP neighbors a predetermined number of consecutive GOPs in which the initial intra frames have been replaced with skip frames;

upon a positive outcome, maintaining the initial intra frame of the identified GOP; and upon a negative outcome, performing steps (c)-(f) with respect to the identified GOP.

9. The method according to claim 1, further comprising:

evaluating if the immediately preceding GOP comprises more than a predetermined number of frames;

upon a positive outcome, maintaining the initial intra frame of the identified GOP; and upon a negative outcome, performing steps (c)-(f) with respect to the identified GOP.

10. The method according to claim 1, wherein the step of obtaining a skip frame comprises;

evaluating if a skip frame of the determined frame configuration is available for retrieval from a memory comprising one or more beforehand generated skip frames, upon positive outcome, retrieving the skip frame having the determined frame configuration from the memory; and upon negative outcome, generating, by an encoding device, a skip frame having the determined frame configuration.

11. The method of claim 1, wherein the skip frame is a picture-level skip frame coded in the bitstream without residual data for the skip frame.

12. The method of claim 11, wherein the skip frame is coded in the bitstream without motion-vector data for the skip frame.

13. The method of claim 1, wherein the skip frame references only a single reference picture.

14. The method of claim 13, wherein the single reference picture is an immediately preceding predictive inter frame of the video sequence in decoding order.

15. A non-transitory computer storage medium having stored thereon instructions for implementing a method, when executed on a device having processing capabilities, of pruning a prediction-coded video sequence, the method comprising:

a) obtaining one or more global motion values for the video sequence, wherein each global motion value represents an amount of motion in a scene depicted by a set of successive image frames in the video sequence;

b) for a set of successive image frames having a global motion value being below a global motion threshold, identifying a group of pictures (GOP) that immediately follows the set of successive image frames in the video sequence, wherein the identified GOP comprises a sub-set of image frames of the video sequence;

c) determining a frame configuration of the image frames of the identified GOP, wherein the determined frame configuration defines settings of frame parameters that need to be the same for a replacement frame in the identified GOP as for the rest of the frames in the identified GOP;

d) obtaining a skip frame having the determined frame configuration, wherein the skip frame is an inter frame that directly references existing image data of at least one previously coded frame of the video sequence and that is coded without interpolation of residual information;

e) replacing the initial intra frame of the identified GOP with the obtained skip frame; and f) configuring the skip frame and the remaining image frames of the identified GOP with a frame numbering that continues a frame numbering of the GOP immediately preceding the identified GOP, whereby a new GOP is formed of frames of the immediately preceding GOP and the identified GOP, wherein replacing the initial intra frame of the identified GOP with the obtained skip frame and configuring the skip frame and the remaining image frames of the identified GOP with a frame numbering that continues a frame numbering of the GOP immediately preceding the identified GOP are performed without transcoding the remaining image frames of the identified GOP, including without decoding and re-encoding the remaining image frames of the identified GOP.

16. A device for pruning a prediction-coded video sequence, the device comprising a processing device being adapted to:

obtain one or more global motion values for the video sequence, wherein each global motion value represents an amount of motion in a scene depicted by a set of successive image frames in the video sequence, for a set of successive image frames having a global motion value being below a global motion threshold, identify a group of pictures (GOP) that immediately follows the set of successive image frames in the video sequence, wherein the identified GOP comprises a sub-set of image frames of the video sequence, determine a frame configuration of the image frames of the identified GOP, wherein the determined frame configuration defines settings of frame parameters that need to be the same for a replacement frame in the identified GOP as for the rest of the frames in the identified GOP, obtain a skip frame having the determined frame configuration, wherein the skip frame is an inter frame that directly references existing image data of at least one previously coded frame of the video sequence and that is coded without interpolation of residual information, replace the initial intra frame of the identified GOP with the obtained skip frame, and configure the skip frame and the remaining image frames of the identified GOP with a frame numbering that continues a frame numbering of the GOP immediately 5 preceding the identified GOP, whereby a new GOP is formed of frames of the immediately preceding GOP and the identified GOP, wherein replacing the initial intra frame of the identified GOP with the obtained skip frame and configuring the 10 skip frame and the remaining image frames of the identified GOP with a frame numbering that continues a frame numbering of the GOP immediately preceding the identified GOP are performed without transcoding the remaining image frames of the identified GOP, 15 including without decoding and re-encoding the remaining image frames of the identified GOP.

* * * * *